Aug. 26, 1952      E. W. MILLER      2,608,137

MACHINE FOR CUTTING TAPER GROOVES

Filed Jan. 31, 1947      5 Sheets-Sheet 1

Inventor
Edward W. Miller
By Wright, Brown, Quimby & May
Attys.

Aug. 26, 1952     E. W. MILLER     2,608,137
MACHINE FOR CUTTING TAPER GROOVES

Filed Jan. 31, 1947     5 Sheets-Sheet 3

Inventor
Edward W. Miller

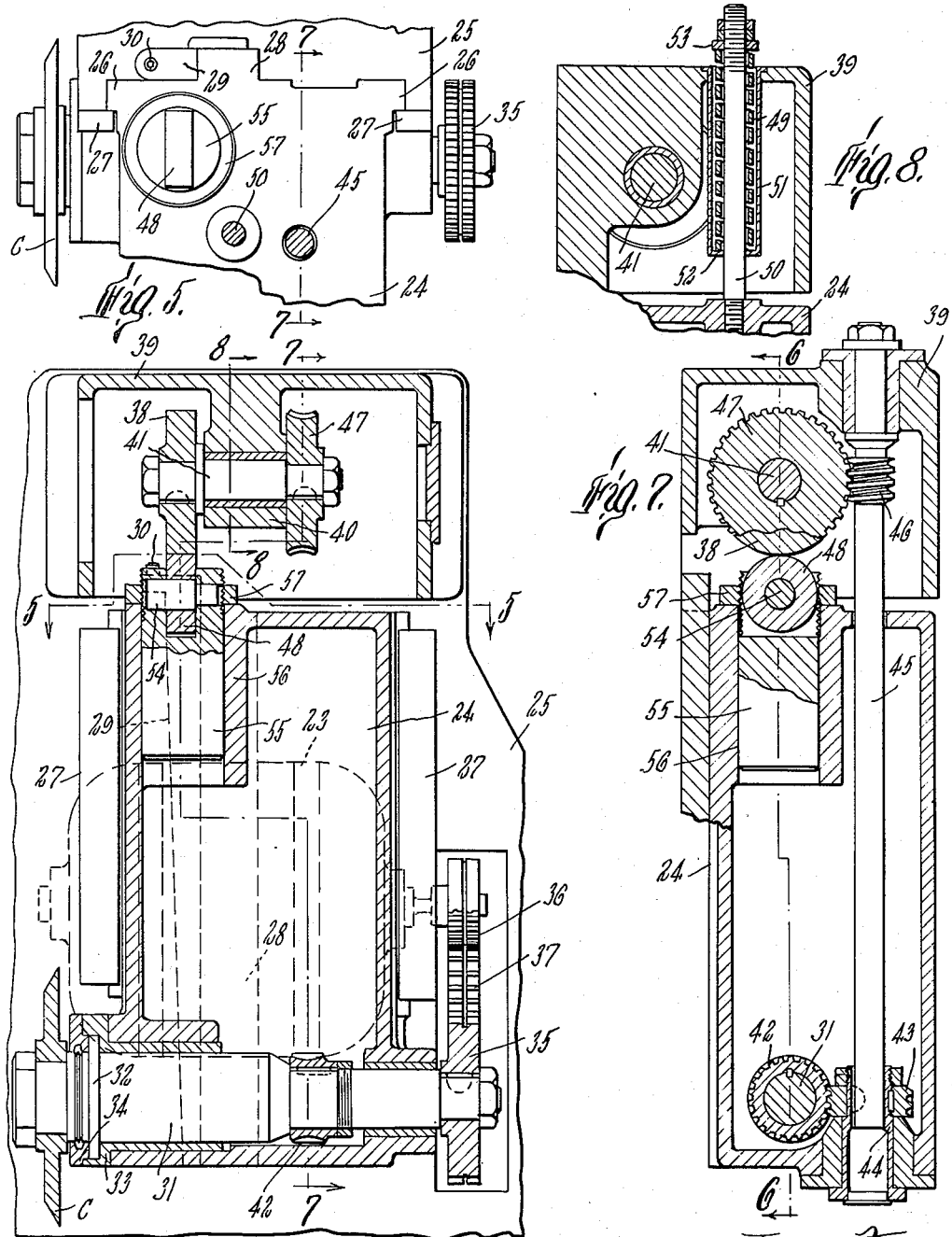

Aug. 26, 1952 E. W. MILLER 2,608,137
MACHINE FOR CUTTING TAPER GROOVES
Filed Jan. 31, 1947 5 Sheets-Sheet 5

Inventor
Edward W. Miller
by Wright, Brown, Quinby
they Attys

Patented Aug. 26, 1952

2,608,137

UNITED STATES PATENT OFFICE 2,608,137

MACHINE FOR CUTTING TAPER GROOVES

Edward W. Miller, Springfield, Vt., assignor to The Fellows Gear Shaper Company, Springfield, Vt., a corporation of Vermont Application January 31, 1947, Serial No. 725,575

13 Claims. (Cl. 90—9)

The subject matter of this invention is a machine tool operable for cutting grooves of varying width in work pieces, such as face clutches and other machine elements or parts of similar or analogous character. Among its objects are to enable the cutting of such grooves to be accomplished with the utmost rapidity and at the same time accurately; to effect the cutting by the simultaneous action of two cutters rotating in divergent planes; to effect simultaneous depth feeding of both cutters while in operation; to provide for adjustment of the cutters as to the angle between their planes of rotation and the relation of such planes to the radius of the work piece; and in other respects to provide an improved machine for performing work of the character indicated.

In the accompanying drawings I have shown a specific machine embodying the invention and designed for cutting interdental grooves in the end face of a cylindrical work piece and thereby forming teeth on such face, which teeth may be radial or more or less inclined to exact radial relationship and both the teeth and interdental spaces are of tapering width between the axis and circumference of the piece.

Fig. 5 is an end view of one of the cutter carriages as viewed in the direction of the arrows applied to the line 5—5 of Fig. 1;

Fig. 6 is a sectional view of one of the cutter carriages on a plane indicated by the line 6—6 of Figs. 3 and 7;

Fig. 7 is a sectional view of the same cutter carriage taken on line 7—7 of Figs. 1, 5 and 6;

Fig. 8 is a sectional view of the depth feed cam bracket taken on line 8—8 of Figs. 1 and 6;

Figs. 9, 10 and 11 are diagrammatic views of the mechanical operating parts and electrical speed control means of the machine;

Like reference characters designate the same parts wherever they appear in all the figures.

Figure 1:
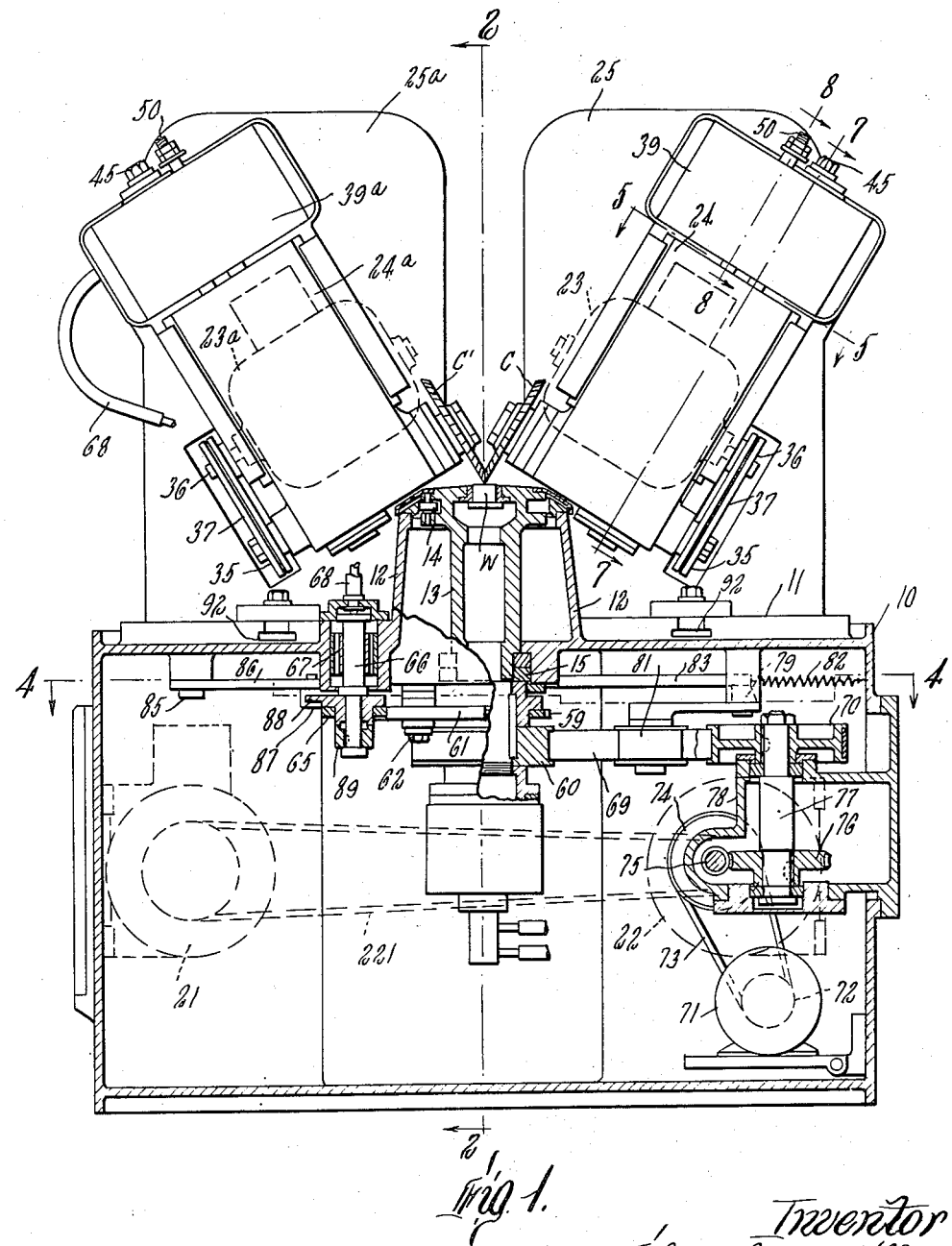
Fig. 1 represents a front elevation, partly broken away and shown in section, of said machine.
Figure 2:
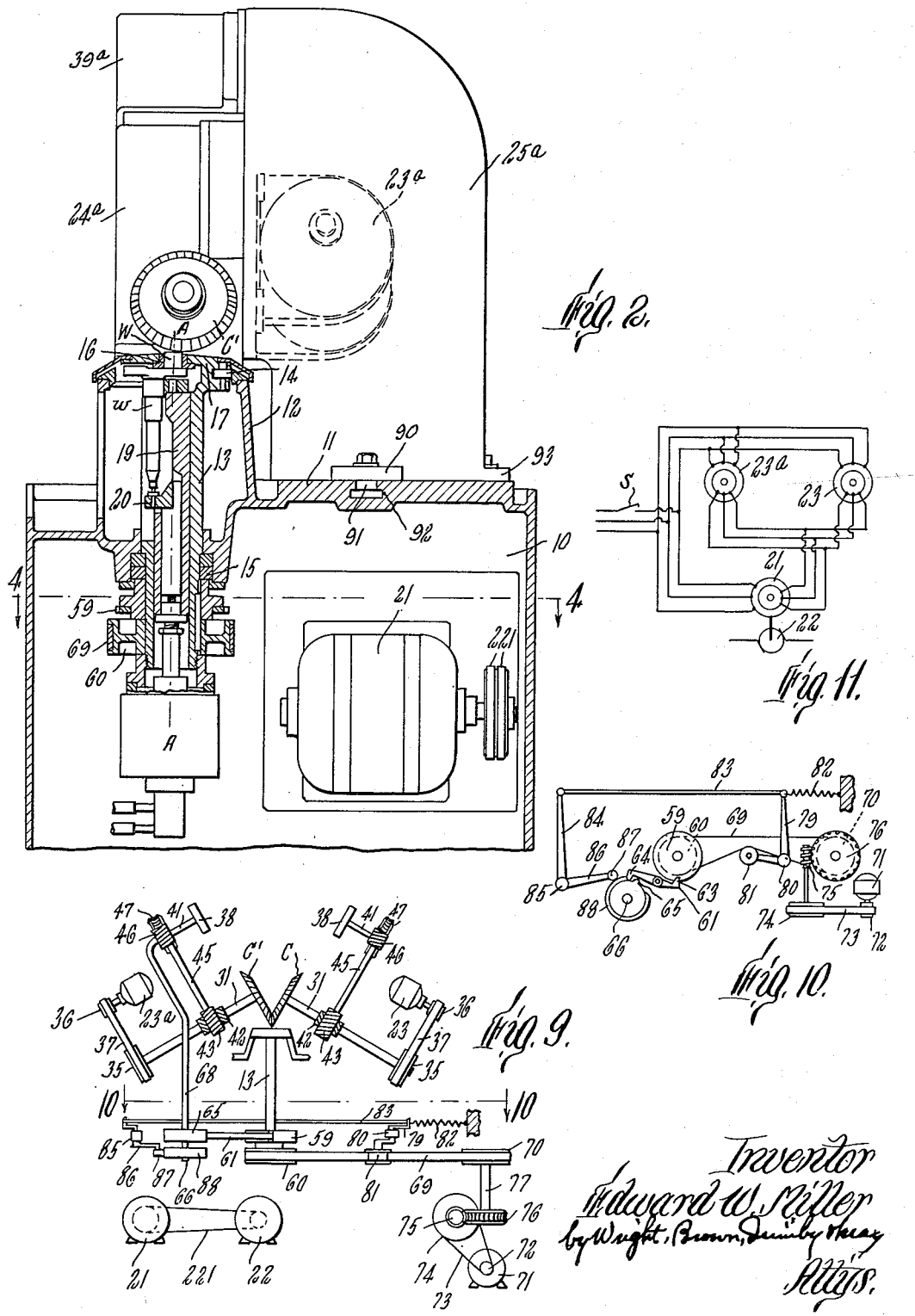
Fig. 2 is a sectional view of the machine taken on a vertical plane represented by the line 2—2 of Fig. 1.

In the machine here represented the cutting action is performed by two milling cutters C and $C^1$ arranged to act on the end face of a cylindrical work piece W. The cutters are circular disks of large diameter with cutting teeth at their circumferences and are mounted with their axes inclined in such manner and so related that the parts or limbs of the cutters nearest to the work piece meet with intermeshing or interleaving of their teeth so as to cooperate in forming a single groove. The cutters and their planes of rotation are further inclined to one another so that the sides of the cut made by the respective cutters are divergent in the direction from the axis toward the circumference of the work piece.

The structure of the machine includes a base 10 of rectangular outline having a horizontal flat top wall 11 and a tubular pedestal 12 rising from the top wall near the forward side of the base. A work holder or spindle 13 is mounted in the pedestal 12 and in the lower part of the base and is centered by roller bearings 14 and 15 so that it can be rotated about a vertical axis A—A. The holder or spindle 13 has means for grasping the work piece arranged to hold the piece so that the part to be cut is centered on the axis A—A. In this instance the part of the work piece on which the cutting action is performed is an eccentric stud connected with a shank $w$ and is contained in a bushing 16 centrally located in the head portion 17 of the holder or spindle 13. An arbor 19 carrying an endwise movable clamp 20 is mounted in the holder for securing the work piece by engaging the clamp with the lower end of shank $w$. The work grasping means here shown are interchangeable with others for holding work pieces of other characters. Their details are immaterial to the present invention, and it is sufficient for this purpose that the machine contains a work holder rotatable about an axis so as to present different areas of the work piece to the action of the cutters.

The cutters are fed into the work piece from a withdrawn position to a prescribed depth, in paths coinciding with their respective planes of rotation. Both are advanced simultaneously and withdrawn simultaneously, and in so moving the teeth of each are moved inwardly and outwardly in the interdental spaces of the other. In order to avoid interference between the teeth of the two cutters and provide clearance for cutting and escape of chips, the cutters are driven at equal peripheral speeds and the tooth spaces of each are wider than the teeth of the other.

Various means for driving the cutters synchronously may be employed, and I have used here an electrical system because of its convenience and flexibility. The one shown in these drawings is known commercially by the term "synchro-tie" and consists of two wound rotor induction motors 23 and 23a mechanically coupled to drive the cutters C and C¹ respectively, a wound rotor induction motor 21 used as a generator or sender, and an electric driving motor 22 mechanically connected by a belt 221 to drive the rotor of the generator. A diagram of the electrical connections of this system is shown in Fig. 11. Lead wires from a three phase power source are connected with the stators of the generator 21 and motors 23 and 23a, and the rotor winding of the generator or sender is connected in three phase circuit with the rotor windings of the motors 23 and 23a. The sender thus keeps the synchro-tie motors in synchronism at rotational speeds determined by the speed of the driving motor 22.

A switch *s* is interposed in one of the lead wires for use in bringing the motors and cutters in step when setting up the machine and preliminary to putting it in operation. Before starting, single phase power is applied to the stators with the switch *s* open. The cutter driving motors are thereby brought into step with the generator. The cutters are applied to their respective shafts or spindles (later described) with their teeth in interleaved relation. Then the switch *s* is closed and three phase power applied to all stators, and power is applied to the main drive motor 22, causing the generator or sender to rotate and the motors 23 and 23a to run in step with the generator and with each other.

The foregoing is an illustrative one of a number of ways in which the synchro-tie system can be applied for the purpose stated.

Figure 12A:
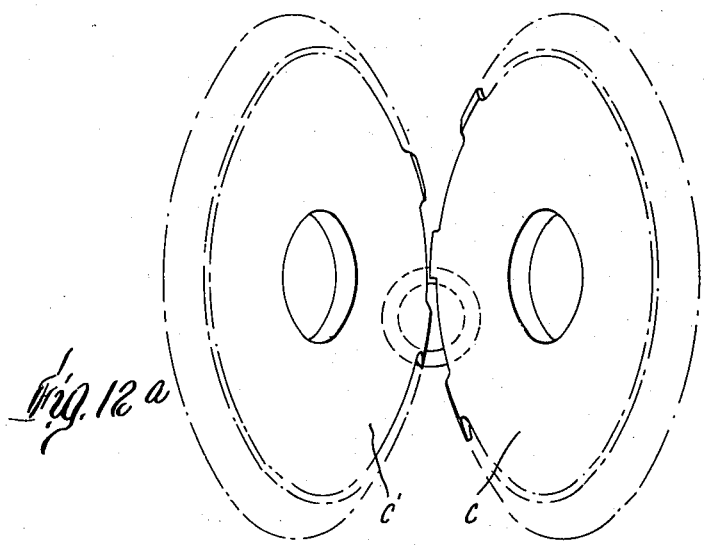
Figs. 12a, 12b and 12c are enlarged views of the cutters, corresponding to Figs. 3, 1 and 2, respectively.
Figure 12B:
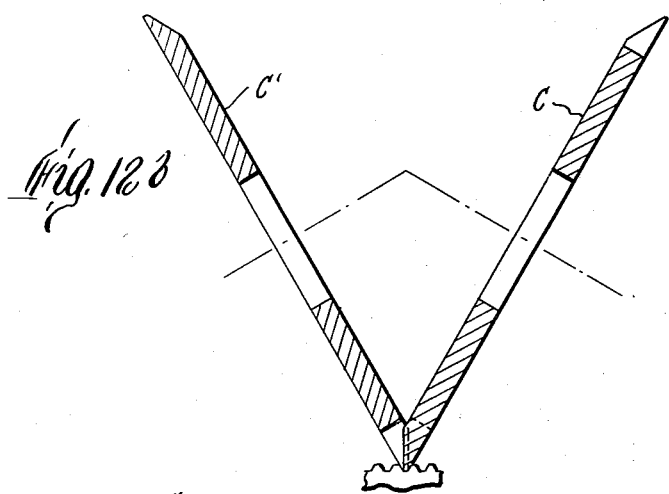
Figure 12C:
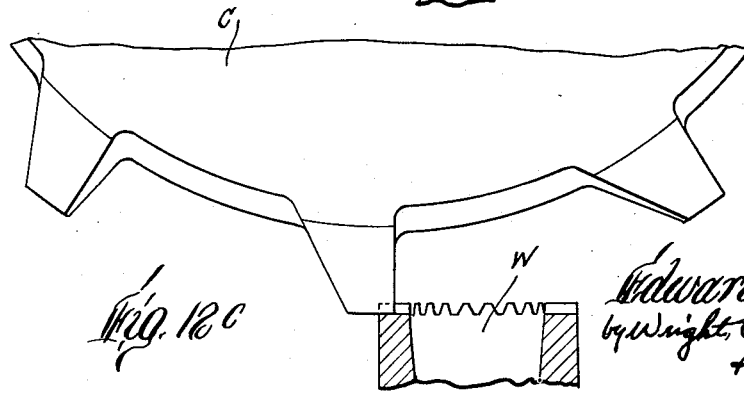

The cutters and their relation to the work are shown in detail by Figs. 12a, 12b and 12c. Their teeth are there seen to be spaced widely enough to afford ample clearance, where interleaved with one another, to permit such lagging of either with respect to the other as may be caused by unequal resistance; as well as to permit escape of chips. If one cutter is impeded more than the other, as by resistance to cutting, friction or other cause, it tends to lag. But the synchro-tie system instantly overcomes that tendency and maintains the required synchronism. Clearances of the order indicated in these figures are sufficient to permit such momentary lagging as may occur, without danger of interference between the interleaved teeth.

Cutter C is mounted on a carriage or slide 24 and cutter C¹ on a carriage or slide 24a. These carriages are mounted and slidable on upright columns 25 and 25a, respectively, which in turn are supported on and secured to the top wall of the base. Both carriages and columns are alike, except for reversals in the arrangement of certain parts which enable them to be disposed symmetrically on either side of a central front to rear plane. The carriage 24 is shown in detail in Figs. 5, 6 and 7 and will now be described. It is fitted at its rear side in an inclined guideway in the upright 25, having lips 26, 26 which are overlapped by gibs 27, 27 on the bounding walls of the guideway, and having a rib 28 at the rear which is fitted in a guideway, parallel to the first named guideway, bounded by an integral surface of the column and a tapered gib 29. A screw 30 is associated with this gib for adjusting it endwise to take up wear.

A cutter spindle 31 is mounted rotatably in bearings in the lower end of the carriage, being confined against endwise movement therein by a flange 32 on the spindle and flanking shoulders 33 and 34 on the bearing. The latter shoulder is formed by a sleeve or nut which is removable to permit insertion and removal of the spindle. Cutter C is secured to the inner end of the spindle, that is, the end which protrudes toward the median plane of the machine, and a sprocket 35 is secured to the outwardly protruding opposite end of the spindle. The synchro-tie driving motor 23 is mounted in the interior space of the column 25 on the inner face of the forward side wall thereof, with its axis parallel to that of the spindle. Its armature shaft carries a sprocket 36 in the same plane with the sprocket 35, and a chain 37 or link belt passes around both sprockets, the column having an opening in its front wall through which the chain passes. Instead of using a metal chain or link belt for the member 37 of this drive, a cog-type belt may be used. There is a substantial distance between the centers of sprockets 35 and 36, and the line of centers makes a large angle with the path of carriage 24. Hence the carriage can be moved through a considerable distance without either tightening the chain too greatly or slackening it enough to risk disengagement from the teeth of either sprocket. The latitude for reciprocating movement thereby allowed to the carriage is ample for any depth of cut within wide limits.

Feeding of the cutter is effected by a depth feed cam 38 contained in a bracket 39 which is secured rigidly to the column 25 above the carriage. This bracket contains a bearing 40, in which a shaft 41 carrying the cam is mounted. Shaft 41 is driven from the cutter spindle 31 by a throated gear 42 thereon, a gear 43 supported rotatably by a bearing 44 in the carriage, meshing with gear 42, a shaft 45 in sliding splined connection with pinion 43, and a worm 46 on shaft 45 meshing with a worm gear 47 on shaft 41. Shaft 45 is held by a bearing in bracket 39.

A cam follower roll 48 is mounted in the carriage and is held in contact with the depth feed cam by a spring 49 (Fig. 8). This spring surrounds a rod 50, which is secured to the carriage and passes through the bracket 39 in parallel with the carriage guides. The spring is contained in a thimble 51, mounted in the bracket 39 and is confined between the end wall 52 of the thimble and an adjustable abutment 53 on rod 50. It is a powerful spring, sufficiently strong to support the weight of the carriage and maintain a firm pressure between the follower roll 48 and the depth feed cam 39. The follower roll is adjustable to vary the limits of the cutter travel, being supported on a pivot 54 in a slot in the upper end of a bar 55 which fits slidingly in a guideway 56 in carriage 24 parallel to the path of movement of the carriage. A stop nut 57, threaded on the upper end of bar 55 and abutting on the upper end of guideway 56 serves for adjusting the position of the follower roll with respect to the carriage.

By the mechanism just described, the depth feed cam is rotated in a definite fixed ratio to the speed of rotation of the cutter spindle. And, as both cutter spindles are rotated at equal speed by the synchro-tie motors, the cams of both spindle carriages are rotated at the same speed. The cams for the two carriages may be exactly alike and may be formed with surfaces which cause a slow advancing, cutting travel and a quick return, so that both cutters enter the work simultaneously and to the same extent. However, the cams may be otherwise designed so as to cause one cutter to advance ahead of the other, if desired.

Figure 4:
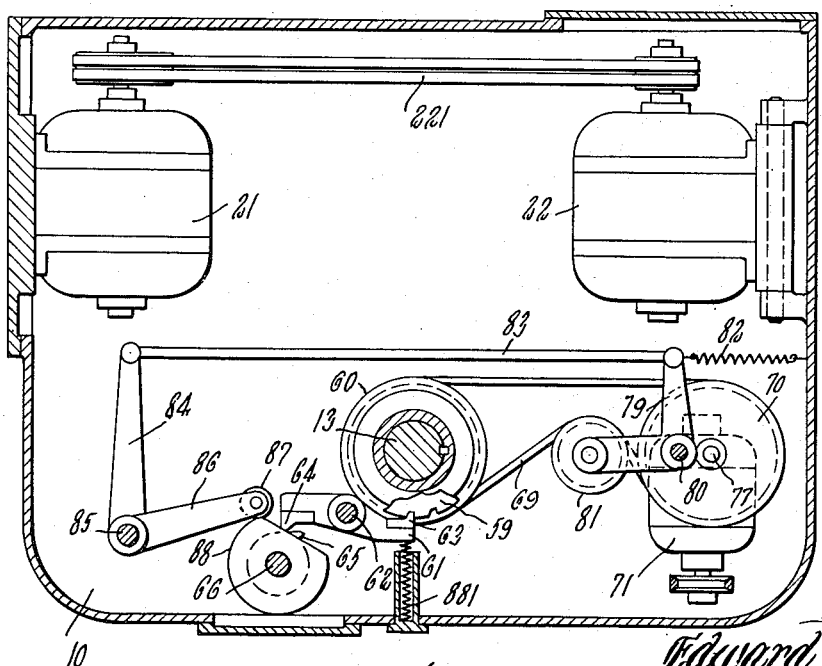
Fig. 4 is a horizontal section taken on line 4—4 of Figs. 1 and 2.

The work holder or spindle 13 is held stationary while cutting is performed, and is turned through a fractional rotation to index the work when the cutters are withdrawn. An index plate 59 and an indexing pulley 60 are keyed to the work spindle below the bearing 15 in the interior space of the base. The index plate is provided with a number of notches in its circumference equal to the number of grooves or spaces to be cut in the work piece, and a latch lever 61 (Fig. 4) is mounted on a pivot 62 which depends from the top wall of the base. This latch lever has a toe 63 on one arm which is adapted to enter any one of the notches of the index plate. The latch lever has a second arm provided with a tapered projection 64 adjacent to a cam 65 which has a single protuberance of small angular extent and is circular and concentric with pivot 62 throughout the rest of its circumference. This cam is coupled with a shaft section 66 mounted in a bearing 67 in the base (Fig. 1) and coupled by a flexible shaft 68 with the shaft (corresponding to shaft 41 shown in Fig. 6) of the depth feed cam for the cutter $C^1$. Thus the cam 65 is rotated in unison with both depth feed cams. The single protuberance of cam 65 is arranged to displace the tail piece 64, and thereby release the index plate 59 during the time when the cutters are withdrawn from the work. Indexing rotation of the work spindle is then effected by the following means.

A belt 69 surrounds the pulley 60 and also a drive pulley 70 in the same plane therewith which is rotated by a motor 71, pulley 72, belt 73, pulley 74, worm 75, worm wheel 76 and shaft 77 (Fig. 1). The worm 75 is on the shaft of pulley 74 and the worm wheel 76 is keyed to shaft 77, to which also pulley 70 is keyed. These two shafts are mounted in bearings in a bracket 78, which is mounted in the base above the motor 71. (Omitted from Fig. 4 for clarity.)

A belt tightener lever 79 is pivoted on a pivot 80 which depends from the top wall of the base. One arm of lever 79 carries a roll 81 bearing against the outer side of one stretch of belt 69 and the other arm of this lever is connected with a spring 82, which is anchored to a wall of the base. The effort of spring 82 is to move the roll 81 toward the other stretch of the belt, thereby tightening the belt on the pulleys. The arm of lever 79 to which spring 82 is connected is coupled by a link 83 with one arm, 84, of a bell crank lever pivoted at 85. The other arm 86 of this lever carries a follower 87 which bears against the rim of a cam 88 secured to shaft 66 adjacent to the cam 65 previously described. Cam 88 has a high dwell through a large proportion of its circumference which is so arranged that, when engaging the follower 87, it holds the linkage 79, 83, 84, 86 so that the belt is slackened and can slip with but small frictional resistance on pulley 60. Cam 88 also has a depression arranged to travel past the follower 87 while the rise of cam 65 acts on the locking lever, and for a short time afterwards. The formation and timing of these cams is such that the cam 88 causes gradual tightening of the belt while the rise of cam 65 passes the tail projection 64 of the index latch lever; this latter cam rise passes away from the tail projection soon after the latch toe has been withdrawn from the index plate 59, but not until after the spindle has been started in rotation by the tightened belt, and permits the latch toe to be pressed against the circumference of the index plate, by a spring 881, between the notch from which it was withdrawn and the next following notch; the belt is held in tight condition during slightly more than the time needed to turn the spindle through the angle between two adjacent notches; the latch toe is caused by its spring to enter the next approaching notch of the index plate and again lock the spindle; and the belt is then slackened until the cams make a further rotation.

It will be seen from Fig. 1 that, as a convenient detail of construction, the cam 65 is mounted on the hub portion of cam 88 in fixed relation thereto, and the latter cam is secured to the shaft 66 by a clutch 89 which is keyed to the shaft. To distinguish these cams from one another by name, cam 65 may be called the index lock cam, and cam 88 the belt tightener cam.

The cutters are of large diameter in comparison with the radius of the work piece, as appears best in Fig. 12c, and are offset from the work spindle so that the vertical through the intersection point of the axes of the two cutter spindles is in the rear of the work spindle axis. This arrangement causes the cut to be deeper near the circumference of the work piece than at and near the center, which is an essential feature of face clutches, and the large radius of the cutters causes the deviation of the circumferential arc, which enters the work, from a straight line, to be very slight.

Figure 3:
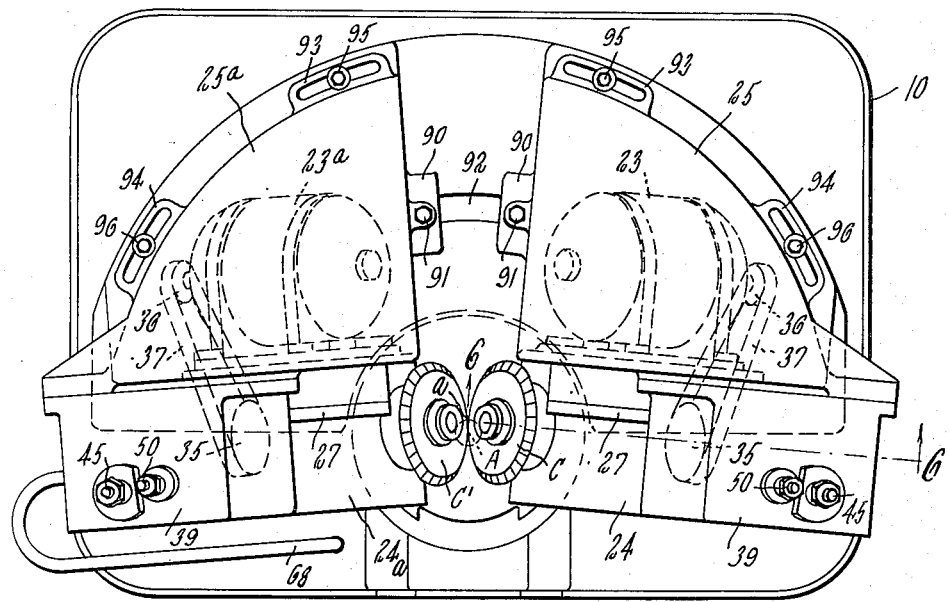
Fig. 3 is a plan view of the machine.

It will be noted from Fig. 3 that the columns 25 and 25a are approximately quadrant shaped in plan and are adjustable angularly on the base. Each has a lug 90 through which a bolt 91 passes and is located so that its head occupies an undercut arcuate slot 92 in the top of the base. Each column also has two lugs 93 and 94 projecting from its curved outer side in which are formed slots concentric with the undercut slot 92, and clamping bolts 95 and 96 pass through these slots into threaded connection with the top wall of the base. These slots are centered on or near the vertical through the intersection of the spindle axes, the center thus identified being indicated by the point $a$ in Fig. 3. The adjustments permitted by the slots described enable the angle between the planes of rotation of the cutter to be made larger or smaller within limits, thereby changing the angle of taper of the grooves cut and teeth formed in the work piece; and both columns may be adjusted in the same direction, in equal or unequal measure so as to cause the cuts to be askew to the radii of the work piece. With the setting shown in these drawings, the cutters make grooves of which the median lines are radial to the work piece, but this condition can be altered by adjustment of the cutter supporting columns as described.

Various modifications and departures from the specific design of machine hereinbefore described and shown in the drawings may be made within the scope of the invention here claimed. For instance, although the illustrated machine is vertical, it is obvious that the same principles, and even substantially the same construction may be employed in a horizontal position or at any other angle; that the inclinations of the cutter axes in planes parallel to the work holder axis may be at other angles than those shown, with appropriate modification of the cone angle at the circumference of the cutters. As here shown, the cutter axes make angles of 30° with the horizontal at respectively opposite inclinations, so that the rotational planes of the cutters interest at an angle of 60°. But this angle may be diminished within limits, or enlarged, by modifications of design. As the teeth of the two cutters are intermeshed, it is possible to make the angle between the inclined edges of the cutter teeth and the edges which lie in, or approximately in, the plane of rotation of each cutter nearly as large as the angle between the two planes of rotation, which enables the latter angle to be made relatively small without requiring the teeth to be made excessively acute, and therefore weak at their tips.

It is possible, and within my contemplation, to construct machines embodying this invention with work spindles at other angles to the planes of the cutters than that shown as, for instance, at an inclination to right or left with respect to Fig. 1, i. e., in more or less close approximation to the plane of one cutter and greater divergence from the plane of the other. Or the spindle may be disposed at an inclination toward the front or the rear, so that the teeth, etc. cut in the work may be in a convex or concave conical arrangement.

Although the two cutters are shown as being of equal diameters, this is not an essential condition, for they may be unequal and the driving connections from their respective motors may have speed ratios in inverse proportion to the ratio of cutter diameters. In any case, however, the two cutters are rotated at equal peripheral speed and in the same direction at the region of mesh between their interleaved teeth.

What I claim is:

1. A machine tool for cutting grooves or spaces, in a generally radial relation to a central point in a face of a work piece, comprising a work holder having means for supporting a work piece with a face thereof exposed to the action of cutting tools, said holder being rotatable about an axis transverse to such face, whereby to enable different portions of the work piece face to be placed in cutting position, a pair of slideable cutter carriages disposed at an inclination to each other, circular cutters mounted on said carriages to rotate in intersecting planes and having peripheral teeth intermeshing adjacent to the line of intersection of such planes, the intermeshing portions of the cutters being adjacent to the location of the work piece for cooperation in cutting a single groove therein, means for rotating the cutters simultaneously at equal speeds and both in the same direction at their meshing points, means for effecting relative depth feeding and return movements between the cutters and work holder in paths coinciding with the planes of rotation of the cutters, and means for imparting a fractional rotation to the work holder for indexing the work piece, said depth feeding and indexing means being correlated to cause the work holder to be so rotated when the cutters are withdrawn from the work and to be held stationary while the cutters enter into the work piece.

2. A machine tool for cutting grooves in a work piece with a generally radial arrangement with respect to a central point, comprising a supporting structure, members mounted on said supporting structure so as to be adjustable about said central point, cutter carriages slideably mounted on said members at an inclination to each other, circular milling cutters having peripheral teeth mounted on the cutter carriages to rotate in intersecting planes with their teeth in intermeshing relation at one side, a work holder mounted on the supporting structure to present a work piece with a face thereof adjacent to the intermeshing portions of the cutters, electric motors in driving connection with the respective cutters, and a generator in circuit with said motors for synchronizing their speeds; the cutters being mechanically free to rotate independently of each other and the driving connections between said motors and cutters being correlated with the diameters of the cutters to cause their intermeshing portions to run at the same linear speed and in the same direction.

3. A cutting machine comprising a work holder, a pair of milling cutters supported to rotate in intersecting planes and arranged with the teeth of each at one side of its axis in intermeshed relation to the teeth of the other and contiguous to the location in which work pieces are held by said work holder, and means for rotating the cutters at equal peripheral speeds comprising an alternating current generator, two synchro-tie electric motors in circuit with said generator to be driven by current from the generator, and transmission means from each of said motors to one of the cutters organized to drive the associated cutter at a prescribed speed ratio to the speed of the motor.

4. In a machine of the character set forth, the combination of a pair of rotatable cutters having peripheral teeth and arranged with the teeth of each, at one side of its axis, in meshing relation with the teeth of the other, and means for driving said cutters at harmonious speeds comprising two synchro-tie electric motors, one of which is in rotation transmitting connection with one of the cutters and the other is in like connection with the other cutter, and an electric current generator in electrical connection with both of said motors for furnishing propelling current thereto.

5. In a machine of the character described, a supporting structure, cutter carriages mounted on said structure with provisions for linear travel in paths inclined to one another, cutter spindles mounted in the respective carriages extending toward one another, cutters on the respective spindles located close to one another, driving means connected to transmit rotation to the respective spindles, a depth feed cam for each carriage disposed to act and react between the carriage with which it is associated and the supporting structure, and transmission means through which the spindle of each carriage drives the depth feed cam associated with that carriage.

6. In a machine tool of the character set forth, a supporting structure, a carriage mounted on said structure with provision for linear movement in a prescribed path, a spindle supported rotatably by said carriage with its axis of rotation transverse to the path of movement thereof, a cutter mounted on said spindle, driving means connected with the spindle for rotating it, a feed cam disposed to act and react between the supporting structure and carriage for imparting movement to the carriage, and transmission means between the spindle and cam organized to rotate the cam at a fixed ratio to the rate of rotation of the spindle.

7. A machine of the character described comprising a base, two columns mounted on said base and rising therefrom, carriages mounted on the respective columns with provisions for guided movement toward and away from the base, a cutter spindle rotatably mounted in each carriage, a cutter mounted on each of the spindles; the carriages, spindles and cutters being so arranged that the cutters are in close proximity to each other at one side of their respective axes and rotate in planes inclined to each other, and the plane of rotation of each cutter is parallel to the path of the carriage by which it is borne, synchro-tie motors mounted in the respective columns in driving connection, each with the spindle of the carriage which is supported by the same column, and an electric current generator in the base coupled to deliver current to both motors simultaneously.

8. A machine of the character described comprising a base, two columns mounted on said base and rising therefrom, carriages mounted on the respective columns, each carriage being in guided engagement with its supporting column for movement toward and away from the base, a cutter spindle rotatably mounted in each carriage, a cutter mounted on each of the spindles; the carriages, spindles and cutters being so arranged that the cutters are in close proximity to each other at one side of their respective axes and rotate in planes inclined to each other, and the plane of rotation of each cutter is parallel to the path of the carriage by which it is borne, synchro-tie motors mounted in the respective columns in driving connection, each with the spindle of the carriage which is supported by the same column, an electric current generator in the base coupled to deliver current to both motors simultaneously, a depth feed cam supported on each column in position to apply propelling force to the carriage which is mounted on the same column, and transmission means actuated by the spindles of the respective carriages connected to transmit rotation to the respectively associated cams.

9. A machine tool as set forth in claim 7, in which the columns are supported for angular adjustment about an axis transverse to the axes of both spindles.

10. A machine tool of the character described comprising a supporting structure, a driving motor and an electric current generator mounted on said supporting structure and in coupled relation for transmission of rotation from the motor to the generator, two milling cutters mounted on the supporting structure to rotate about axes that are inclined to one another and so located that the teeth of each cutter at one side of its axis are intermeshed with teeth of the other cutter, means to provide adjustment of said cutters about a central axis, two synchro-tie motors mounted on the supporting structure, each in driving connection with one of said cutters for imparting motion thereto, and an electric current generator coupled with both synchro-tie motors to drive them at equal speeds.

11. A machine tool as set forth in claim 10, in which the cutters are movable back and forth in their respective planes of rotation, and means are provided for so moving them.

12. In a machine of the character described, a base, a work holder journaled in said base, a pair of supports moveably mounted on said base for adjustment about the axis of said work holder, means to secure said supports in their adjusted position, a pair of cutter carriages slideably mounted on said supports at an inclination to each other, a pair of milling cutters on said cutter carriages with their teeth intermeshing and adapted to form teeth on a work piece held in said work holder, and means coacting between said supports and said carriages to feed and retract said cutters towards and away from said work holder.

13. In a machine of the character described, a base, a work holder journaled in said base, a pair of supports moveably mounted on said base for adjustment about the axis of said work holder, means to secure said supports in their adjusted position, a pair of cutter carriages slideably mounted on said supports at an inclination to each other, a pair of milling cutters on said cutter carriages with their teeth intermeshing and adapted to form teeth on a work piece held in said work holder, means coacting between said supports and said carriages to feed and retract said cutters towards and away from said work holder, and means to vary the limits of said feeding and retraction.

EDWARD W. MILLER.

REFERENCES CITED

The following references are of record in the file of this patent:

UNITED STATES PATENTS

| Number | Name | Date |
|---|---|---|
| 1,311,583 | Zetterlund | July 29, 1919 |
| 1,370,573 | Wingqvist | Mar. 8, 1921 |
| 1,756,831 | Marsilius | Apr. 29, 1930 |
| 2,149,791 | Saupe | Mar. 7, 1939 |
| 2,187,550 | Tow | Jan. 16, 1940 |
| 2,388,872 | Scarff | Nov. 13, 1945 |
| 2,393,727 | Aber | Jan. 29, 1946 |
| 2,410,913 | Wildhaber | Nov. 12, 1946 |
| 2,427,641 | Wildhaber | Sept. 16, 1947 |
| 2,435,405 | Braeg | Feb. 3, 1948 |

FOREIGN PATENTS

| Number | Country | Date |
|---|---|---|
| 535,236 | Germany | Oct. 9, 1931 |